United States Patent [19]

Regele

[11] Patent Number: 4,459,451
[45] Date of Patent: Jul. 10, 1984

[54] INDUCTION HARDENING APPARATUS AND PROCESS FOR THE USE THEREOF

[75] Inventor: Paul Regele, Bopfingen-Aufhausen, Fed. Rep. of Germany

[73] Assignee: Maschinenfabrik Alfing Kessler GmbH, Fed. Rep. of Germany

[21] Appl. No.: 322,805

[22] Filed: Nov. 19, 1981

[30] Foreign Application Priority Data

Oct. 24, 1979 [EP] European Pat. Off. ........ 79104122.1

[51] Int. Cl.$^3$ ............................................. H05B 6/36
[52] U.S. Cl. .............................. 219/10.57; 219/10.69; 219/10.71; 219/10.79; 266/129
[58] Field of Search ............... 219/10.69, 10.57, 10.71, 219/10.67, 10.73, 10.75, 10.79, 10.43, 10.49 R; 266/129, 124; 148/146, 150, 154

[56] References Cited

U.S. PATENT DOCUMENTS

| | | | |
|---|---|---|---|
| 2,484,238 | 10/1949 | Molloy | 219/10.67 |
| 2,743,345 | 4/1956 | Seulen et al. | 219/10.43 |
| 3,174,738 | 3/1965 | Seulen et al. | 219/10.57 X |
| 3,967,089 | 6/1976 | Seulen et al. | 219/10.57 X |
| 4,194,728 | 3/1980 | Stengel et al. | 219/10.57 X |
| 4,258,241 | 3/1981 | Soworowski | 219/10.71 |

FOREIGN PATENT DOCUMENTS 0027828  5/1981  European Pat. Off. ............... 10.71/

Primary Examiner—C. C. Shaw
Assistant Examiner—Philip H. Leung
Attorney, Agent, or Firm—William A. Drucker

[57] ABSTRACT

An inductor for heating rotating metal workpieces, especially for surface hardening the running surfaces, transition radii and shoulders of camshafts to different depths, has two or more heating regions which can be brought into the required heating position by changing the direction of rotation of the workpieces and, when the inductor has more than two heating regions, by using a movable abutment. When the inductor has two heating regions, then change from one region to another is achieved by simply changing the direction of workpiece rotation so that friction causes the inductor to be displaced. When the inductor has, for example, three heating regions (13, 14, 15), then an abutment (11) is used to control the inductor displacement. For more rapid displacement of the inductor or for cases where the workpiece is stationary, an external pusher device may be used.

3 Claims, 6 Drawing Figures

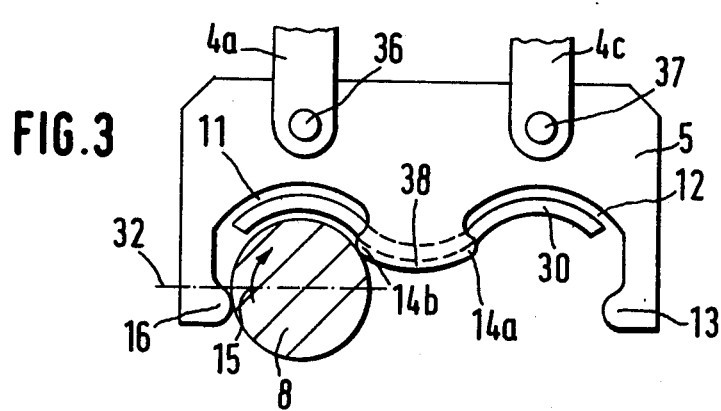
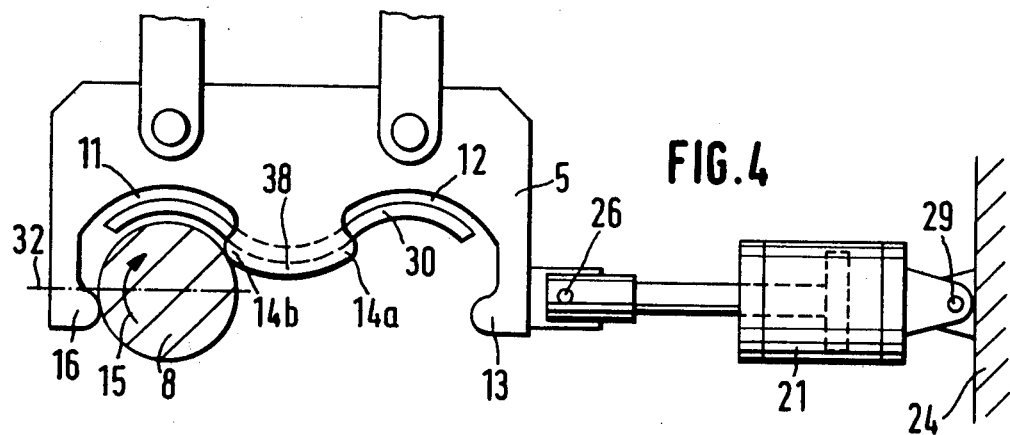
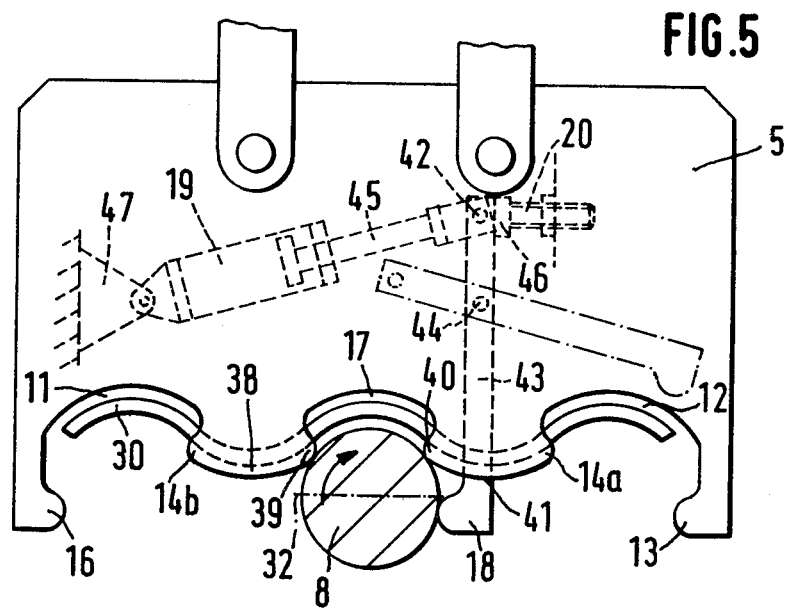

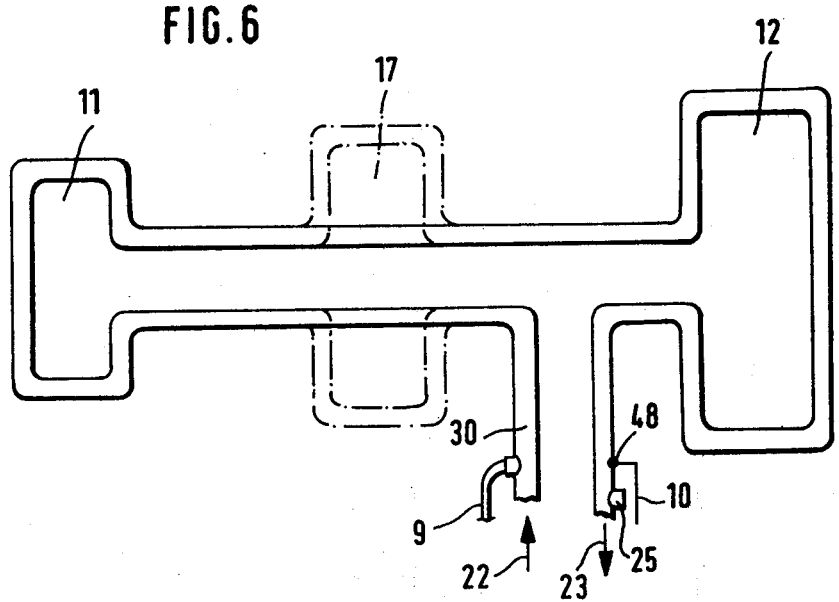

INDUCTION HARDENING APPARATUS AND PROCESS FOR THE USE THEREOF

BACKGROUND OF THE INVENTION

The invention relates to an apparatus for the induction hardening of workpieces rotatable about the rotation axis and in particular crankshaft bearings in the rotary process. It is conventional practice in this respect to heat different parts of the workpiece surface by means of differently shaped inductors, for which purpose the workpiece is horizontally secured and rotates. These differently shaped inductors make it possible to produce varying hardened layers or action depths.

It is necessary to juxtapose these differently shaped inductors in an inductor magazine and successively convey them to the workpiece for use. However, this involves a very complicated apparatus. Inter alia, it must be possible to automatically couple the inductors to the transformer terminals.

It is also known that these hardening plants comprise the most varied equipment, which successively receive the workpieces to be hardened in the clamping device, bring them into the heating position at the inductors, rotate them for hardening purposes, immerse them in a quenching bath or place them in a quenching shower and then pass them on from the plant for further treatment.

According to the prior art, at least 1 minute is required for the aforementioned replacement of the inductors from the magazine, because it is necessary to perform relatively long travel movements, carry out pivotal movements, as well as the stopping and rotation of the parts to be hardened (German Pat. Nos. 2,332,832 and 2,334,126).

BRIEF SUMMARY OF THE INVENTION

It is the main objective of the invention to significantly reduce the time for this operating sequence.

In this connection, a further objective of the invention is to ensure that an inductor magazine with a relatively large number of inductors no longer need to be used.

A further objective of the invention is to provide an inductor having a plurality of different heating areas, which can be very rapidly successively put into use and through which the same current and same cooling fluid can flow.

BRIEF DESCRIPTION OF THE DRAWINGS

The invention is described in greater detail hereinafter relative to two non-limitative embodiments and the attached drawings, wherein show:

FIG. 3 a section along the A-B of FIG. 1 on a much larger scale.

FIG. 4 a section similar to FIG. 3 with an additional component.

FIG. 5 a view similar to FIG. 4 relative to the second embodiment.

FIG. 6 a diagrammatic view of the cooling and heating device relating to both embodiments.

DETAILED DESCRIPTION OF THE PREFERRED EMBODIMENTS

Figure 1:
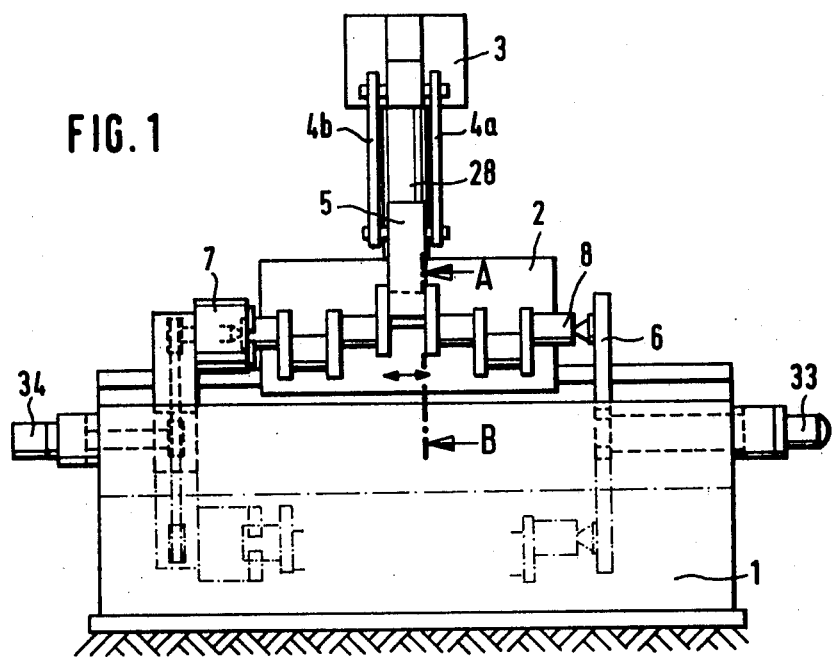
FIG. 1 a front view of the complete apparatus according to the invention.

At the bottom of FIG. 1, it is possible to see the hardening container 1 into which the workpieces 8 can be lowered in the manner indicated by the broken lines in the lower part of container 1. To the right and left thereof, it is possible to see two flanged driving motors 33, 34. The right-hand motor 33 operates the holding device or support 6 for workpiece 8, whilst the left-hand motor 34 inter alia constitutes the drive 7 for workpiece 8, which is hereby made to rotate in the direction of arrow 35, cf FIG. 2.

In this case, inductor 5 is placed on workpiece 8 in the centre of the apparatus, the workpiece being constituted by a crankshaft. The inductor 5 is held by a parallel guide movably held on workpiece 8 by arms 4a, 4b and 4c, cf also FIG. 2. Over arms 4 it is possible to see frame 3, whose height can be adjusted on a vertical guide 28.

Figure 2:
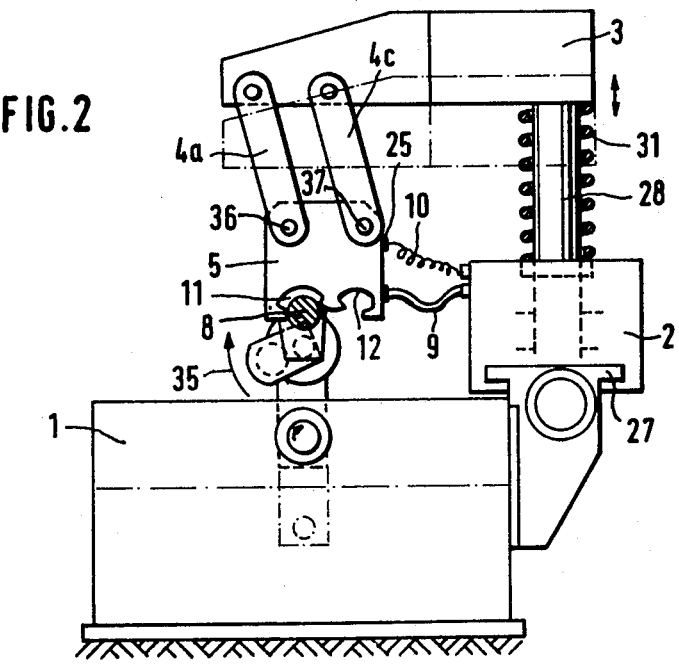
FIG. 2 a side view of the apparatus of FIG. 1.

FIG. 2 shows that the said vertical guide 28 is formed by a column surrounded by springs 31 and at the bottom rests on a support 2, which is longitudinally displaceable. This is the direction perpendicular to the drawing plane of FIG. 2. Hose 9 leads to the bottom left from support 2 and over said support 2 an electric cable 10 leads to inductor 5, whose weight rests on workpiece 8.

The contours of frame 3 are shown somewhat lower in broken line form to illustrate that frame 3 can be lowered from its represented position. For this purpose, a device, which is not described in detail, is provided within support 2. This device acts counter to the action of compression spring 31 in order to keep frame 3 in position. This is necessary inter alia for changing workpiece 8. Equipment of this general type are known to the Expert from the prior art, so that there is no need to describe them in detail.

However, it is novel in the present invention that there is only a single hose 9 with permanent connections and that electric cable 10 only has fixed non-changeable connections, e.g. connection 25 on inductor 5, as will be described in greater detail hereinafter. It is also important for the invention that during the operation inductor 5 must not be changed, because in this case it has two heating areas 11 and 12, which can be brought into action by moving inductor 5 at right angles to the longitudinal direction of workpiece 8 as will be explained in greater detail hereinafter.

FIG. 3 shows a first embodiment of the inductor 5 according to the invention suspended at the top on the two arms 4a, 4c, as can be gathered from FIG. 2. The arms are movably connected to inductor 5 by means of joints or articulations 36, 37.

According to the invention, inductor 5 has in this case two heating areas 11, 12 and in the represented position heating area 11 rests on workpiece 8 with at least part of its weight. It is in contact with the workpiece by the two cams 16 and 14b. Cam 16, which can also be called a stop member, is located in the vicinity of the axis 32 of the workpiece. In this case, the workpiece rotates in the direction of arrow 15. Above workpiece 8, it is possible to see heating conductor 30, generally constructed as a copper tube and through which flows a cooling fluid. It passes from the left-hand heating area 11 through inductor 5 to the right-hand heating area 12. There is a downwardly directed slight curvature 38 between cam 14b and cam 14a. The lug cam 14b is located above axis 32.

The right-hand heating area 12 is constructed in complementary manner to the left-hand heating area 11 and has a stop member 13 in the vicinity of axis 32, as well as the superimposed cam 14a. The two cams 14a and 14b are approximately at the same height.

If during the operation of the apparatus the heating area has to be changed, it is merely necessary to stop the machine and then to start operating again in a workpiece rotation direction which is the opposite to direction 15. Due to static friction between workpiece 8 and lug cam 14b, inductor 5 is moved to the left over curvature 38 until it strikes against workpiece 8 with cam 13. The further heating can then immediately start without stopping the machine. For heating purposes, it is unimportant in which direction workpiece 8 is rotated.

FIG. 4 shows another possibility for changing the heating area during the operation of the apparatus. For this purpose, an operating cylinder 21 is provided in the right-hand area arranged at the left over a fork 26 with inductor 5 and at the right over a fork 29 on a vertical wall 25. It can, for example, be a pneumatic piston-cylinder device 21. If fork 26 is fixed to inductor 5, it is then necessary for the piston of device 21 to follow the movements of the inductor during heating on the workpiece. To this end, it is possible, for example, for both sides of the piston, e.g. the pressure and tension sides to be vented in order to permit an easy movement of the piston. In addition, the stroke of the piston can be adjustable in cylinder 21, so that an additional control of the correct position is provided.

If in this case the heating area is to be changed, due to the momentum of the piston-cylinder device 21 inductor 5 is moved to the left and once again slides via its curvature 38 over workpiece 8 until it comes to rest against the two stop members 13 and 14a. This shows the advantage that it is unnecessary to stop the apparatus, because it is not necessary to change the rotation direction 15. Thus, device 21 makes it possible to even more quickly change the heating area. The piston-cylinder device 21 ensures that an undesired displacement of inductor 5 cannot take place on the workpiece by this other rotation direction.

There is no need to describe the piston-cylinder device 21 in detail, because such devices are commercially available for the most varied purposes, even with an adjustable stroke movement.

FIG. 5 shows another embodiment with three heating areas 11, 17 and 12 of inductor 5. Whereas the two outer heating areas 11 and 12 are constructed in the same way as in the preceding drawings, namely with a lower cam 16, 13 and an upper cam 14a, 14b on the opposite side of the workpiece, the additional heating area 17 only has two lug cams 39, 40, both of which are positioned above the axis 32 of workpiece 8. In order that workpiece 8 remains in this central heating area 17, as shown it is necessary to provide an additional movable stop 18. This ensures that the aforementioned friction drive in the case of the rotation direction as shown in FIG. 5 does not lead to a leftward displacement of the inductor.

An operating member 19 is shown by broken lines above it and it is once again constituted by a piston-cylinder device. The latter is connected by means of a joint 42 with trip lever 43, which is in turn pivotable about joint 44. If piston rod 45 is retracted to the left, then trip lever 43 with stop 18 pivots into the position shown by the broken line and in which in the manner stated hereinbefore inductor 5 is moved to the left on workpiece 8 via the curvature 41 to heating area 12.

There is also a travel limitation 20 for piston rod 45 having a stop 46 adjustable by means of a screw mechanism. In addition, cylinder 19 is once again connected by means of a fork 47 with inductor 5.

FIG. 6 shows heating conductor 30 with its heating areas 11, 17, 12. The central heating area 17 is only shown by broken lines for the case that only two heating areas 11 and 12 are to be provided. The installation of heating conductor 30 has been explained in connection with the preceding drawings. It comprises the electrical conductor 30 through which flows the cooling fluid. Conductor 30 is connected by means of connection 25, which is not shown in detail here, to hose 9 of FIG. 2. The coolant flow direction is indicated by arrows 22 and 23. There is also an electrical connection or terminal 48 for electrical cable 10, cf also FIG. 2, which is indicated in a purely diagrammatic manner because such electrical connections are well known to the Expert.

Thus, both the coolant and the electric current successively flow through heating areas 11 and 12 or all the heating areas 11, 17 and 12. Thus, there is a series connection of the heating areas. However, only that energy quantity required by the particular heating loop in inductive cooperation with the mass of the part to be hardened and located therein is required for attaining the desired temperature.

The apparatus also has a device for the separate regulations of the individual heating areas 11, 17 and 12, which leads to an energy saving. Regulating devices of this type are well known to the Expert and need not therefore be shown. FIG. 6 shows the series connection between them by means of which the same current and the same coolant flows through the different heating areas 11, 17 and 12.

The invention is not restricted to the represented embodiments and the Expert can realise various variants therefore without passing beyond the scope of the invention. Thus, if necessary, there can be more than three heating areas in one inductor 5. However, it is also possible to construct the operating devices 19 or 21 in a manner differing from that shown in order to achieve the same action.

In this connection, it is in particular decisive that it is unnecessary for the purpose of changing the heating area to raise the inductor from the workpiece, which leads to a considerable time saving.

According to the invention, heating areas 11 17 and 12 are in each case quadrant-shaped and their ends hang together and are drawn apart at the opposite end over the diameter area. The embodiments according to FIGS. 3 and 4 with only two heating areas have the advantage that operating members are not required. However, with the three heating areas according to FIG. 5, a faster change time and a more accurate control of the heat supply are possible.

What is claimed is:

1. Apparatus for hardening of a workpiece by induction heating, comprising:
   means for rotating a workpiece, such as a crankshaft, about its longitudinal axis,
   a heating area having heating area ends,
   induction heating means in said heating area disposed above a bearing surface of said workpiece and including at least two series connected inductors extending normal to said axis and partially encircling said bearing surface, means mounting said induction heating means for movements vertically and horizontally across said axis to locate a selected one of the inductors in opposed relation to said bearing surface of said workpiece, lug cams at the outer part of the heating area to keep the heating area of the workpiece in its position during turning of said workpiece, an electrical source and a source of cooling medium, means connecting said electrical source to said inductor for conducting heating current therethrough and means connecting said inductor to said source for cooling medium, said induction heating means being movable to position said selected one of the inductors over said bearing in dependence on the direction of rotation of said workpiece.

2. Apparatus according to claim 1 wherein the induction heating means includes at least three inductors and also including a movable stop member for stopping said movable induction heating means to position said selected one of the inductors opposite said bearing.

3. Apparatus for hardening of a workpiece by induction heating as set forth in claim 1 wherein said heating area includes plural heating regions.

* * * * *